United States Patent
Li et al.

(10) Patent No.: US 11,385,710 B2
(45) Date of Patent: Jul. 12, 2022

(54) GEOMETRIC PARAMETER MEASUREMENT METHOD AND DEVICE THEREOF, AUGMENTED REALITY DEVICE, AND STORAGE MEDIUM

(71) Applicant: BOE TECHNOLOGY GROUP CO., LTD., Beijing (CN)

(72) Inventors: Dianmeng Li, Beijing (CN); Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 335 days.

(21) Appl. No.: 16/498,822

(22) PCT Filed: Apr. 24, 2019

(86) PCT No.: PCT/CN2019/084110
§ 371 (c)(1),
(2) Date: Sep. 27, 2019

(87) PCT Pub. No.: WO2019/206187
PCT Pub. Date: Oct. 31, 2019

(65) Prior Publication Data
US 2021/0357024 A1    Nov. 18, 2021

(30) Foreign Application Priority Data
Apr. 28, 2018 (CN) .......................... 201810401274.X

(51) Int. Cl.
*G06K 9/00* (2022.01)
*G06F 3/01* (2006.01)
(Continued)

(52) U.S. Cl.
CPC ............... *G06F 3/013* (2013.01); *G06T 7/13* (2017.01); *G06T 7/60* (2013.01); *G06T 7/73* (2017.01); *G06T 2207/30201* (2013.01)

(58) Field of Classification Search
CPC ... G06F 3/013; G06T 7/13; G06T 7/60; G06T 7/73; G06T 2207/30201
See application file for complete search history.

(56) References Cited

U.S. PATENT DOCUMENTS 6,449,309 B1 *  9/2002  Tabata ................. H04N 13/344
                                                         348/E13.047
6,545,650 B1 *  4/2003  Yamada ................. G02B 30/24
                                                           348/E9.026
(Continued)

FOREIGN PATENT DOCUMENTS

CN    102830793 A    12/2012
CN    104395815 A    3/2015
(Continued)

OTHER PUBLICATIONS

An Application of Augmented Reality to Thickness Inspection, Kyung H. Chung et al., CCC 1090-8471/99/04331-12, 1999, pp. 331-342 (Year: 1999).*

*Primary Examiner* — Jayesh A Patel
(74) *Attorney, Agent, or Firm* — Leason Ellis LLP

(57) ABSTRACT

A geometric parameter measurement method and a device thereof, an augmented reality device, and a storage medium are provided. The geometric parameter measurement method includes: acquiring a left eye image and a right eye image upon a user gazing at a target object, and determining a left eye sight line and a right eye sight line based on the left eye image and the right eye image, which images are acquired upon the user gazing at the target object; determining, according to the left eye sight line and the right eye sight line, a convergence point of the left eye sight line and the right eye sight line; and calculating geometric parameters of the target object in a case where the convergence point coincides with a desired position on the target object.

16 Claims, 7 Drawing Sheets

(51) Int. Cl.
*G06T 7/73* (2017.01)
*G06T 7/13* (2017.01)
*G06T 7/60* (2017.01)

(56) References Cited

U.S. PATENT DOCUMENTS

| | | | | |
|---|---|---|---|---|
| 9,880,384 B2* | 1/2018 | Wilson | | A61B 3/113 |
| 10,345,595 B2* | 7/2019 | Deng | | G06F 3/011 |
| 10,520,732 B2 | 12/2019 | Amitai | | |
| 2006/0250322 A1* | 11/2006 | Hall | | G02B 27/0172 |
| | | | | 345/8 |
| 2009/0304232 A1* | 12/2009 | Tsukizawa | | G06V 40/193 |
| | | | | 382/103 |
| 2010/0322479 A1* | 12/2010 | Cleveland | | H04N 5/23296 |
| | | | | 348/47 |
| 2011/0075257 A1* | 3/2011 | Hua | | H04N 13/322 |
| | | | | 359/464 |
| 2012/0127284 A1* | 5/2012 | Bar-Zeev | | G06T 19/006 |
| | | | | 348/158 |
| 2013/0093788 A1* | 4/2013 | Liu | | G02B 27/017 |
| | | | | 345/633 |
| 2013/0128364 A1* | 5/2013 | Wheeler | | G06F 3/013 |
| | | | | 359/630 |
| 2013/0241805 A1* | 9/2013 | Gomez | | G06F 3/013 |
| | | | | 345/8 |
| 2014/0333665 A1* | 11/2014 | Sylvan | | G02B 7/12 |
| | | | | 345/633 |
| 2015/0288944 A1* | 10/2015 | Nistico | | G06F 3/017 |
| | | | | 345/156 |
| 2016/0012643 A1* | 1/2016 | Kezele | | H04N 13/156 |
| | | | | 345/633 |
| 2017/0231490 A1* | 8/2017 | Toth | | A61B 18/02 |
| | | | | 600/558 |
| 2019/0086674 A1* | 3/2019 | Sinay | | G02B 27/0172 |
| 2019/0188895 A1* | 6/2019 | Miller, IV | | G06F 3/011 |

FOREIGN PATENT DOCUMENTS

| | | | | |
|---|---|---|---|---|
| CN | 107111381 A | | 8/2017 | |
| CN | 107657235 A | | 2/2018 | |
| CN | 107884930 A | * | 4/2018 | ......... G02B 27/0093 |
| CN | 107884930 A | | 4/2018 | |
| CN | 108592865 A | | 9/2018 | |

* cited by examiner

GEOMETRIC PARAMETER MEASUREMENT METHOD AND DEVICE THEREOF, AUGMENTED REALITY DEVICE, AND STORAGE MEDIUM

CROSS-REFERENCE TO RELATED APPLICATION

The present application is a U.S. National Stage Application under U.S.C. § 371 of International Patent Application No. PCT/CN2019/084110, filed Apr. 24, 2019, which claims priority of Chinese Patent Application No. 201810401274.X, filed on Apr. 28, 2018, both of which are incorporated by reference in their entireties as part of the present application.

TECHNICAL FIELD

At least one embodiment of the present disclosure relates to a geometric parameter measurement method and a device thereof, an augmented reality device, and a storage medium.

BACKGROUND

An augmented reality (AR) technology is a new technology that integrates real-world information with virtual information, is characterized by applying the virtual information to a real environment, can integrate material objects in the real environment and the virtual information into a same picture or space, thereby achieving a sensory experience that transcends reality.

An existing virtual reality system simulates a virtual three-dimensional world mainly through a high-performance computing system with a central processing unit, and provides users with a sensory experience of sight, hearing, etc., so that the users can feel that they are personally on the scene, and at the same time, human-computer interaction can also be achieved.

SUMMARY

At least one embodiment of the present disclosure provides a geometric parameter measurement method, comprising: acquiring a left eye image and a right eye image upon a user gazing at a target object, and determining a left eye sight line and a right eye sight line based on the left eye image and the right eye image, which images are acquired upon the user gazing at the target object; determining, according to the left eye sight line and the right eye sight line, a convergence point of the left eye sight line and the right eye sight line; and calculating geometric parameters of the target object in a case where the convergence point coincides with a desired position on the target object.

For example, the geometric parameter measurement method provided by at least one embodiment of the present disclosure further comprises: marking a position of the convergence point in a case where a retention time period of the convergence point is greater than a preset threshold.

For example, in the geometric parameter measurement method provided by at least one embodiment of the present disclosure, the geometric parameters of the target object are calculated in a case where the position of the convergence point, which is marked, coincides with the desired position on the target object.

For example, in the geometric parameter measurement method provided by at least one embodiment of the present disclosure, determining the left eye sight line and the right eye sight line based on the left eye image and the right eye image, which images are acquired upon the user gazing at the target object, comprises: based on the left eye image and the right eye image, which images are acquired upon the user gazing at the target object, determining a left eye pupil position, a right eye pupil position, a left eye center position, and a right eye center position; and determining the left eye sight line and the right eye sight line according to the left eye pupil position, the right eye pupil position, the left eye center position, and the right eye center position.

For example, in the geometric parameter measurement method provided by at least one embodiment of the present disclosure, calculating the geometric parameters of the target object comprises: calculating a distance between a position of the convergence point and the user in a case where the position of the convergence point coincides with the desired position on the target object; and determining the geometric parameters of the target object according to a plurality of distances, which are calculated, between positions of a plurality of convergence points and the user, and a sight line deflection angle upon the user gazing at different desired positions on the target object.

For example, in the geometric parameter measurement method provided by at least one embodiment of the present disclosure, calculating the distance between the position of the convergence point and the user comprises: calculating the distance between the position of the convergence point and the user according to a complementary angle of an included angle between the left eye sight line and a straight line passing through the left eye center position and the right eye center position, a complementary angle of an included angle between the right eye sight line and the straight line passing through the left eye center position and the right eye center position, and a linear distance between the left eye center position and the right eye center position.

For example, in the geometric parameter measurement method provided by at least one embodiment of the present disclosure, the plurality of distances between the positions of the plurality of convergence points and the user comprise a first distance between a position of a convergence point, that coincides with a desired position on a first edge of the target object, and the user, and a second distance between a position of a convergence point, that coincides with a desired position on a second edge of the target object, and the user; and the first edge is an edge, which is opposite to the second edge, of the target object.

For example, in the geometric parameter measurement method provided by at least one embodiment of the present disclosure, the sight line deflection angle upon the user gazing at the different desired positions on the target object is an angle between a first distance and a second distance.

For example, in the geometric parameter measurement method provided by at least one embodiment of the present disclosure, the geometric parameters of the target object comprise: a height of the target object, a width of the target object, or a thickness of the target object.

For example, in the geometric parameter measurement method provided by at least one embodiment of the present disclosure, the geometric parameters of the target object are calculated in a case of receiving an instruction which is used to indicate that the position of the convergence point, which is marked, coincides with the desired position on the target object.

For example, in the geometric parameter measurement method provided by at least one embodiment of the present disclosure, the geometric parameter measurement method is applied to an augmented reality device.

At least one embodiment of the present disclosure further provides a geometric parameter measurement device, comprising: a sight line determination unit, configured to acquire a left eye image and a right eye image upon a user gazing at a target object and determine a left eye sight line and a right eye sight line based on the left eye image and the right eye image, which images are acquired upon the user gazing at the target object, a convergence point determination unit, configured to determine, according to the left eye sight line and the right eye sight line, a convergence point of the left eye sight line and the right eye sight line; and a geometric parameter calculation unit, configured to calculate geometric parameters of the target object in a case where the convergence point coincides with a desired position on the target object.

For example, the geometric parameter measurement device provided by at least one embodiment of the present disclosure further comprises a convergence point position marking unit. The convergence point position marking unit is configured to mark a position of the convergence point in a case where a retention time period of the convergence point is greater than a preset threshold, and the geometric parameter calculation unit is configured to calculate the geometric parameters of the target object in a case where the position of the convergence point, which is marked, coincides with the desired position on the target object.

For example, in the geometric parameter measurement device provided by at least one embodiment of the present disclosure, the sight line determination unit comprises: a determination sub-unit of pupil positions and center position of a left eye and a right eye, configured to, based on the left eye image and the right eye image, which images are acquired upon the user gazing at the target object, determine a left eye pupil position, a right eye pupil position, a left eye center position, and a right eye center position; and a sight line acquisition sub-unit, configured to determine the left eye sight line and the right eye sight line according to the left eye pupil position, the right eye pupil position, the left eye center position, and the right eye center position.

For example, in the geometric parameter measurement device provided by at least one embodiment of the present disclosure, the geometric parameter calculation unit comprises: a distance calculation sub-unit, configured to calculate a distance between a position of the convergence point and the user in a case where the position of the convergence point, which is marked, coincides with the desired position on the target object; and a geometric parameter calculation sub-unit, configured to determine the geometric parameters of the target object according to a plurality of distances between positions of a plurality of convergence points and the user, and a sight line deflection angle upon the user gazing at different desired positions on the target object.

For example, in the geometric parameter measurement device provided by at least one embodiment of the present disclosure, the distance calculation sub-unit is configured to calculate the distance between the position of the convergence point and the user according to a complementary angle of an included angle between the left eye sight line and a straight line passing through the left eye center position and the right eye center position, a complementary angle of an included angle between the right eye sight line and the straight line passing through the left eye center position and the right eye center position, and a linear distance between the left eye center position and the right eye center position.

At least one embodiment of the present disclosure further provides a geometric parameter measurement device, comprising: a processor; a machine readable storage medium, storing one or more computer program modules; the one or more computer program modules are stored in the machine readable storage medium and configured to be executed by the processor, and the one or more computer program modules comprise instructions which are used to be executed to achieve the geometric parameter measurement method according to any one of the embodiments of the present disclosure.

At least one embodiment of the present disclosure further provides an augmented reality device, comprising the geometric parameter measurement device according to any one of the embodiments of the present disclosure.

At least one embodiment of the present disclosure further provides a storage medium, non-transitorily storing computer readable instructions, in a case where the computer readable instructions, which are non-transitorily stored, are executed by a computer, the geometric parameter measurement method according to any one of the embodiments of the present disclosure is executed.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

Figure 1:
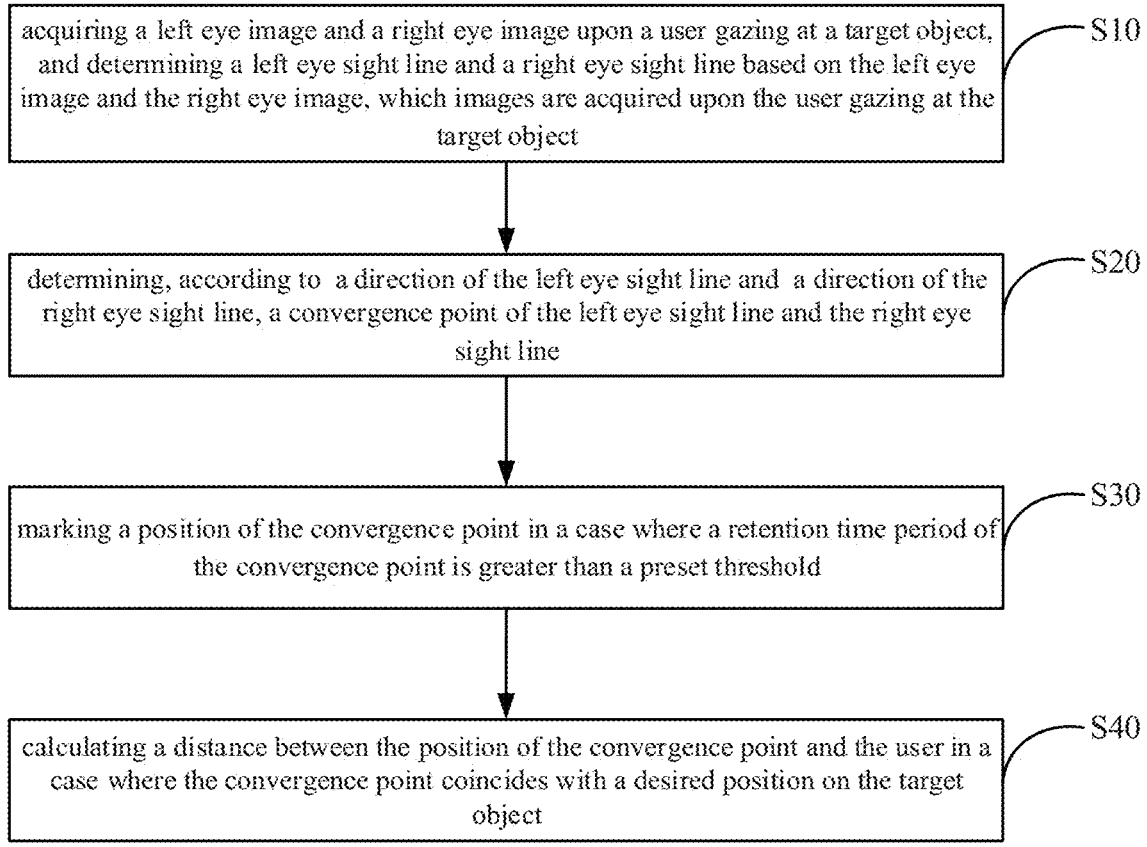
FIG. 1 is a flow chart of a geometric parameter measurement method according to at least one embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Exemplary embodiments will be described in detail herein, and examples of the exemplary embodiments are illustrated in the accompanying drawings. In a case where the following description refers to the drawings, unless otherwise indicated, the same numerals in different drawings indicate the same or similar elements. The implementations described in the following exemplary embodiments are not intended to represent all embodiments which are consistent with the present disclosure. On the contrary, these implementations are merely examples of devices and methods which are consistent with some aspects of the present disclosure as described in the appended claims in detail.

For example, an augmented reality (AR) device can have a function of tracking human eye, and there is still a large expandable space for the function of the augmented reality device in this aspect.

At least one embodiment of the present disclosure provides a geometric parameter measurement method, comprising: acquiring a left eye image and a right eye image upon a user gazing at a target object, and determining a left eye sight line and a right eye sight line based on the left eye image and the right eye image, which images are acquired upon the user gazing at the target object, determining, according to the left eye sight line and the right eye sight line, a convergence point of the left eye sight line and the right eye sight line; and calculating geometric parameters of the target object in a case where the convergence point coincides with a desired position on the target object.

At least one embodiment of the present disclosure provides a geometric parameter measurement device, an augmented reality device, and a storage medium corresponding to the above geometric parameter measurement method.

The geometric parameter measurement method provided by the above embodiment of the present disclosure can determine a distance between the desired position on the target object and the user according to the left eye image and the right eye image, to obtain the geometric parameters of the target object, thereby expanding the function of the AR device and improving the user experience of the AR device.

The embodiments of the present disclosure will be described in detail below with reference to the accompanying drawings.

At least one embodiment of the present disclosure provides a geometric parameter measurement method which can be applied to an AR device, a VR device (Virtual reality, VR for short), or the like, and the embodiments of the present disclosure are not limited thereto. So that the function of the AR/VR device can be further expanded, and the user experience of the AR/VE device is improved. The following embodiments are described by taking a case of the geometric parameter measurement method being applied to the AR device as an example.

For example, the geometric parameter measurement method can be implemented at least partially by a software method, and can be loaded and executed by a processor in the AR device, or can be implemented at least partially by a hardware or firmware method, so as to expand the function of the AR device and improve the user experience of the AR device.

FIG. 1 is a flow chart of a geometric parameter measurement method according to at least one embodiment of the present disclosure. As shown in FIG. 1, for example, in some examples, the geometric parameter measurement method comprises step S10, step S20, and step S40; in some other examples, the geometric parameter measurement method further comprises step S30. The steps S10 to S40 of the geometric parameter measurement method and exemplary implementations of the steps S10 to S40 are respectively described below.

Step S10: acquiring a left eye image and a right eye image upon a user gazing at a target object, and determining a left eye sight line and a right eye sight line based on the left eye image and the right eye image, which images are acquired upon the user gazing at the target object.

Step S20: determining, according to a direction of the left eye sight line and a direction of the right eye sight line, a convergence point of the left eye sight line and the right eye sight line.

Step S30: marking a position of the convergence point in a case where a retention time period of the convergence point is greater than a preset threshold.

Step S40: calculating a distance between the position of the convergence point and the user in a case where the convergence point coincides with a desired position on the target object.

As for step S10, for example, the user can observe light incident into a field of view of two eyes of the user after wearing the AR device, the light can be reflected by the eyes, and light reflected by the two eyes (including a left eye and a right eye) can be received by a camera device or some specialized optical sensors, and thus the left eye image and the right eye image can be acquired.

For example, the camera device may comprise a CMOS (complementary metal oxide semiconductor) sensor, a CCD (charge couple device) sensor, an infrared camera, or the like. For example, the camera device can be disposed in a plane in which an OLED display is located, for example, be disposed on a frame of the AR device.

For example, left-right eye features, which comprise left eye features and right eye features, can be obtained by performing image recognition, feature extraction and the like on the left eye image and the right eye image. For example, eye features may comprise features, such as a pupil center of an eye, a pupil size of the eye, corneal reflection information of the eye, an iris center, an iris size, or the like. Furthermore, left-right eye sight lines, which comprise the left eye sight line and the right eye sight line, can be determined by performing operational processing according to the eye features. For example, a sight line refers to a straight line between the eye and a certain position on the target object in a case where the eye of the user is gazing at the certain position on the target object while the user views the target object.

For example, a large number (for example, 10000 or more) of images including left and right eyes may be collected in advance as a sample library, and feature extraction is performed on the images in the sample library. And then, a classification model is trained and tested through an algorithm such as machine learning (for example, deep learning, or regression algorithm based on local feature) by using the images in the sample library and feature points which are exacted, so as to obtain the classification model for acquiring the left eye image and the right eye image of the user. For example, the classification model can also be implemented by other algorithms in the art such as a support vector machine (SVM) and the like, and the embodiment of the present disclosure is not limited thereto. It should be noted that the machine learning algorithm can be implemented by using a method in the art, and details are not described herein again. For example, an input of the classification model is the images which are acquired, and an output of the classification model is the left eye image and the right eye image of the user, so that image recognition can be achieved.

For example, the extraction of the feature points of the eye can be achieved by Scale-invariant Feature Transform (SIFT) feature extraction algorithm, Histogram of Oriented Gradient (HOG) feature extraction algorithm, and other algorithms in the art, and the embodiment of the present disclosure is not limited thereto.

As for step S20, for example, in a case where the two eyes are gazing at a certain position of the target object, the left eye sight line and the right eye sight line will converge on the certain position, and a convergence position is referred to as a convergence point in various embodiments of the present disclosure.

After the user wears the AR device, the user can observe actual objects in a real environment within a field of view of the user and virtual information projected to the user's eyes, and the virtual information and the actual objects can be merged into the same picture or space to achieve a sensory experience that transcends reality.

As for step S40, in a case where the convergence point coincides with the desired position on the target object, the geometric parameters of the target object can be calculated. For example, the geometric parameters of the target object comprise: a height of the target object, a width of the target object, or a thickness of the target object, or the like, and the embodiments of the present disclosure are not limited thereto.

In a case of calculating the geometric parameters of the target object, for example, in some examples, according to step S30, for example, the target object in at least one embodiment of the present disclosure refers to an actual object in a real environment observed by a user, if the user gazes at a certain position of the target object for a relatively long period of time, the user may be more interested in the target object and may want to know more about the detailed information and the like of the target object. Based on this, in the geometric parameter measurement method provided by at least one embodiment of the present disclosure, the retention time period of the convergence point is calculated. For example, the retention time period of the convergence point is time that two eyes of the user are gazing at a certain position on the target object, and in a case where the retention time is greater than a preset threshold, the position of the convergence point is marked. For example, the preset threshold can be determined according to actual conditions, and the embodiment of the present disclosure is not limited thereto.

For example, methods for marking the position of the convergence point may be various methods, for example, a marker graphic (a circular point, a square frame, or a cross graphic) can be provided, the marker graphic is projected in front of the user through the AR device, and the user can observe the marker graphic through the eyes, that is, the user can observe the position of the convergence point that is marked.

For example, after marking the position of the convergence point, two eyes of the user can observe the position of the convergence point through the AR device, the position of the convergence point may not be in the same position as the desired position on the target object, that is, the position of the convergence point may not coincide with the desired position on the target object, in this case, the user can adjust the left eye sight line and the right eye sight line by a method of turning a head, changing a position, turning an eyeball, or the like, and in a case where the convergence point, which is marked, coincides with the desired position on the target object, the geometric parameters of the target object are calculated.

For example, in some examples, in a case where the convergence point coincides with the desired position on the target object, the user can give an instruction by operating a button or a virtual menu set on the AR device, that is, the instruction for indicating that the position of the convergence point coincides with the desired position on the target object is generated, in a case where the AR device receives the instruction, or in a case where the AR device directly detects that the convergence point coincides with the desired position on the target object, a distance between the position of the convergence point and the user or the like can be calculated to calculate the geometric parameters of the target object. For example, a specific calculation method for calculating the geometric parameters of the target object will be described in detail below, and details are not described herein again.

For example, the desired position on the above target object is a certain position on the target object that the user desires to see, and may be any position on the target object. For example, in a case of determining the height of the target object, the desired position may be an upper edge position and a lower edge position of the target object; in a case of determining the width of the target object, the desired position may be a left edge position and a right edge position of the target object.

It can be seen from the above description that the geometric parameter measurement method determines the left eye sight line and the right eye sight line of the user according to the left eye features and the right eye features, and furthermore determines the convergence point of the left eye sight line and the right eye sight line, in a case where the position of the convergence point, which is marked, coincides with the desired position on the target object, the distance between the position of the convergence point and the user can be calculated, the distance is also a distance between the desired position on the target object and the user, and the distance can allow the user to know a distance between the user and a certain position on the target object, thereby calculating the geometric parameters of the target object based on the distance. Therefore, the function of the AR device can be expanded by the above method, and the user experience of the AR device is improved.

It should be noted that, a button or a virtual menu that can generate a measurement instruction can be set on the AR device, in a case where the user operates the button or the menu, the measurement instruction is generated, and in this case, the AR device is in a measurement function mode. After that, the AR device starts to perform the measurement method, acquires the left eye features and the right eye features, calculates the retention time period of the convergence point, calculates the distance between the convergence point and the user, and the like, in a case where the AR device does not receive the measurement instruction, the AR device can implement an existing function, so as to avoid the AR device from performing the above method in real time and prevent from causing unnecessary consumption.

Figure 2A:
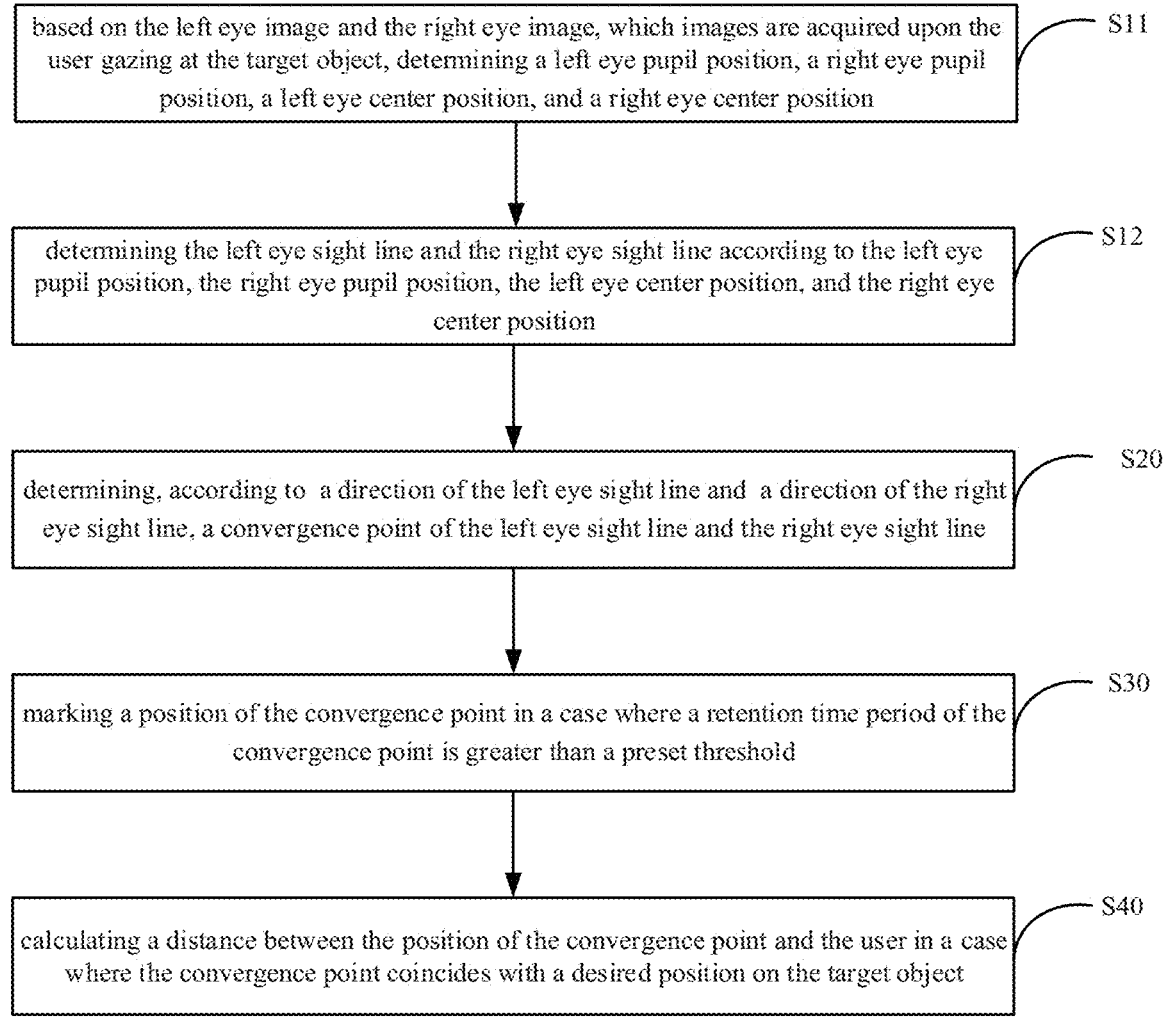
FIG. 2A is a flow chart of another geometric parameter measurement method according to at least one embodiment of the present disclosure.

In some implementations, as shown in FIG. 2A, determining the direction of the left eye sight line of the user and the direction of the right eye sight line of the user according to the left eye features and the right eye features, which features are acquired upon the user gazing at the target object, as described in the above step S10, comprises: step S11 to step S12. The step S11 to step S12 of the geometric parameter measurement method and exemplary implementations of the step S11 to step S12 are respectively described below.

Step S11: based on the left eye image and the right eye image, which images are acquired upon the user gazing at the target object, determining a left eye pupil position, a right eye pupil position, a left eye center position, and a right eye center position.

Step S12: determining the left eye sight line and the right eye sight line according to the left eye pupil position, the right eye pupil position, the left eye center position, and the right eye center position.

For example, in at least one embodiment of the present disclosure, in a case of determining the direction of the left eye sight line and the direction of the right eye sight line, the left eye pupil position, the right eye pupil position, the left eye center position, and the right eye center position are recognized according to the left eye image and the right eye image which are acquired, thereby determining the direction of the left eye sight line and the direction of the right eye sight line. Specifically, the left eye pupil position and the left eye center position are determined from the left eye image by an image recognition algorithm, and the right eye pupil position and the right eye center position are determined from the right eye image by the image recognition algorithm.

For example, after acquiring the left eye image and the right eye image, a center position of the left eye image and a center position of the right eye image can be extracted respectively by a centroid method. For example, pupil contours can be determined and the feature points of pupil images can be obtained by a Canny edge detection algorithm, a Hough transform fitting method, a double ellipse fitting algorithm, or the like, and then contours of the pupils are verified and fitted to determine center positions of the pupils.

For example, the left eye center position and the right eye center position can coincide with a center position of a left eye pupil and a center position of a right eye pupil, respectively, or may not coincide with the center position of the left eye pupil and the center position of the right eye pupil, and the embodiments of the present disclosure are not limited thereto. For example, in some examples, referring to FIG. 3, the left eye pupil position and the right eye pupil position may be a position a1, where a left eye pupil center is located, and a position a2, where a right eye pupil center is located, respectively, the left eye center position can refer to a center of an entire left eye area, for example, FIG. 3 schematically shows that both a left eye area and a right eye area are elliptical areas, the left eye center position b1 may refer to a center of the elliptical left eye area, and similarly, the right eye pupil position b2 may refer to a center of the entire elliptical right eye area.

Figure 3:
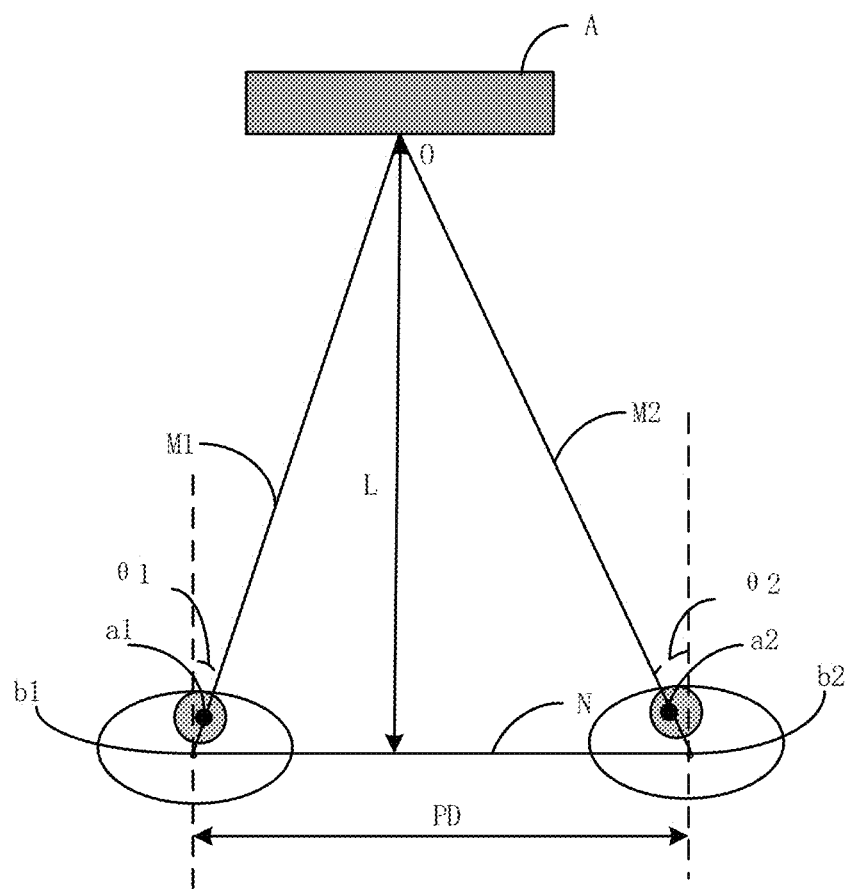
FIG. 3 is a schematic diagram of a relationship among a left eye sight line, a right eye sight line, and a desired position on a target object according to at least one embodiment of the present disclosure.

For example, the left eye sight line can be determined according to the left eye pupil position and the left eye center position, as shown in FIG. 3, the left eye sight line M1 is a line segment that passes through the left eye center position b1 and the left eye pupil position a1 and extends to a certain position on the target object A. For example, the certain position on the target object A may the desired position, or may not be the desired position, and the embodiment of the present disclosure is not limited thereto. For example, the right eye sight line M2 is a line segment that passes through the right eye center position b2 and the right eye pupil position a2 and extends to a certain position on the target object A. The position (that is the position O of the convergence point), where the left eye sight line and the right eye sight line converge, is a certain position on the target object.

It should be noted that, the above left eye pupil position, the right eye pupil position, the left eye center position, and the right eye center position may not be accurate positions and may have some certain errors, the left eye sight line and the determined right eye sight line, which are determined, also have some certain errors, and the distance, which is calculated, between the position of the convergence point and the user may also have errors, however, these errors are all allowed. This method only needs to calculate an approximate distance between the position of the convergence point (that is, a certain position on the target object) and the user.

Figure 2B:
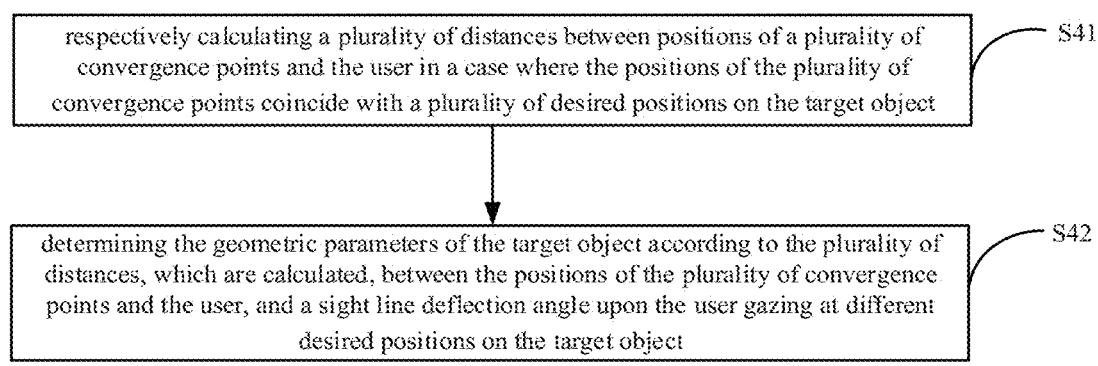
FIG. 2B is a flow chart of step S40 as shown in FIG. 1 or FIG. 2A.

In some examples, as shown in FIG. 2B, calculating the geometric parameters of the target object described in the above step S40 comprises step S41 to step S42. The step S41 to step S42 of the geometric parameter measurement method and exemplary implementations of the step S41 to step S42 are respectively described below.

Step S41: respectively calculating a plurality of distances between positions of a plurality of convergence points and the user in a case where the positions of the plurality of convergence points coincide with a plurality of desired positions on the target object.

Step S42: determining the geometric parameters of the target object according to the plurality of distances, which are calculated, between the positions of the plurality of convergence points and the user, and a sight line deflection angle upon the user gazing at different desired positions on the target object.

As for step S41, for example, the distance between the position of the convergence point and the user is calculated according to a complementary angle of an included angle between the left eye sight line and a straight line passing through the left eye center position and the right eye center position, a complementary angle of an included angle between the right eye sight line and the straight line passing through the left eye center position and the right eye center position, and a linear distance between the left eye center position and the right eye center position.

For example, as shown in FIG. 3, the straight line passing through the left eye center position and the right eye center position is N, the complementary angle of the included angle between the left eye sight line M1 and the straight line N is θ1, and the complementary angle θ1 may also be referred to as a left eye pupil deflection angle; the complementary angle of the included angle between the right eye sight line M2 and the straight line N is θ2, and the complementary angle θ2 may also be referred to as a right eye pupil deflection angle; and the linear distance between the left eye center position and the right eye center position is PD, that is, a distance between the left eye pupil and the right eye pupil is PD, the linear distance between the left eye center position and the right eye center position may be a preset value, or a value calculated in real time according to the left eye pupil position and the right eye pupil position.

For example, it can be seen according to a geometric relationship that, the distance L between the position O of the convergence point and the user, the linear distance PD of the left eye center position and the right eye center position, the above-described left eye pupil deflection angle θ1, and the right eye pupil deflection angle θ2 have the following relationship:

$$L*\tan θ1 + L*\tan θ2 = PD$$

Then, the following formula can be used to calculate the distance L between the position O of the convergence point and the user:

$$L = \frac{PD}{\tan θ1 + \tan θ2}$$

For example, in some examples, the geometric parameters of the target object may be determined according to the plurality of distances, which are calculated, between the positions of the plurality of convergence points and the user, and a sight line deflection angle upon the user gazing at the different desired positions on the target object.

As for step S42, for example, in at least one embodiment of the present disclosure, the geometric parameters of the target object may further be determined according to the plurality of distances, which are calculated above, and the sight line deflection angle upon the user gazing at the different desired positions on the target object.

For example, the plurality of distances between the positions of the plurality of convergence points and the user comprise a first distance between a position of a convergence point, that coincides with a desired position on a first edge of the target object, and the user, and a second distance between a position of a convergence point, that coincides with a desired position on a second edge of the target object, and the user. For example, the first edge and the second edge are two opposite edges, for example, are an upper edge and a lower edge, or a left edge and a right edge, and the like, and the embodiment of the present disclosure is not limited thereto.

Figure 4:
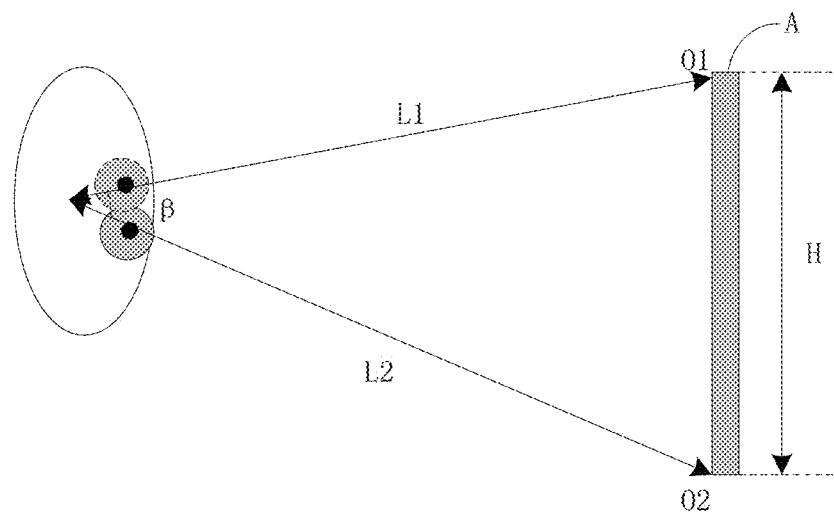
FIG. 4 is a schematic diagram of another relationship among a left eye sight line, a right eye sight line, and a desired position on a target object according to at least one embodiment of the present disclosure.

For example, as shown in FIG. 4, assuming that the left eye and the right eye of the user continue to gaze at a certain position (such as, the desired position on the first edge) on the target object A, a convergence point of the left eye sight line and the right eye sight line determined according to the left eye sight line and the right eye sight line is a first convergence point, the retention time period of the first convergence point is greater than a preset threshold, a position of the first convergence point is marked as a point O1, in a case of receiving an instruction which indicates that the position O1, which is marked, of the first convergence point coincides with a first desired position (such as, the desired position on the first edge) on the target object A, the first distance between the position O1 of the first convergence point and the user is calculated as L1. Similarly, in a case where the left eye and the right eye of the user continuously gaze at another position (such as, the desired position on the second edge) on the target object A, a convergence point of the left eye sight line and the right eye sight line determined according to the left eye sight line and the right eye sight line is a second convergence point, the retention time period of the second convergence point is greater than a preset threshold, a position of the second convergence point is marked as a point O2, in a case of receiving an instruction which indicates that the position O2, which is marked, of the second convergence point coincides with a second desired position (such as, the desired position on the second edge) on the target object A, the second distance between the position O2 of the second convergence point and the user is calculated as L2.

For example, upon the user gazing at the different desired positions on the target object, a head deflection angle (for example, a deflection angle from the user gazing at the first desired position to the user gazing at the second desired position) can be obtained according to a gyroscope on the AR device. For example, the head deflection angle can serve as the sight line deflection angle, for example, as shown in FIG. 4, the sight line deflection angle is: a deflection angle β between a sight line in a case where the user gazes at the first desired position, which coincides with the position O1 of the first convergence point, and a sight line in a case where the user gazes at the second desired position, which coincides with the position O2 of the second convergence point, that is, the deflection angle β between the first distance L1 and the second distance L2.

It can be seen, according to a geometric relationship, that, the first distance L1, the second distance L2, the sight line deflection angle β, and a distance H between the position O1 (that is, the first desired position) of the first convergence point and the position O2 (that is, the second desired position) of the second convergence point have the following relationship:

$$H = \sqrt{L_1^2 + L_2^2 - 2L_1L_2\cos β}$$

where H is the distance between the two desired positions on the target object A. For example, the distance is one of the geometric parameters of the target object, for example, is a width, height, or thickness of the target object A.

For example, if the position O1 of the above first convergence point is a certain position (such as, the first desired position) located on an upper edge (such as, the first edge) of the target object A, and the position O1 of the first convergence point coincides with the first desired position on the upper edge, then the above first distance L1 is a distance between the position O1 of the first convergence point, that coincides with a desired position on the upper edge, and the user; if the position O2 of the above second convergence point is another position (such as, the second desired position) located on a lower edge (such as, the second edge) of the target object A, and the position O2 of the second convergence point coincides with the second desired position on the lower edge, then the above second distance L2 is a distance between the position O2 of the second convergence point, that coincides with a desired position on the lower edge, and the user, according to the above formula, the distance H between the first desired position on the upper edge and the second desired position on the lower edge can be calculated, and the distance H is the height of the target object. Similarly, other geometric parameters of the target object, such as the width of the target object (for example, a distance between a desired position on a left edge and a desired position on a right edge) and the thickness of the target object, or a distance between other parts on the target object, etc., can be determine by referring to the above method.

Certainly, the above description is only an example to illustrate a method for calculating the geometric parameters of the target object, and the geometric parameters of the target object can also be determined by other calculation methods according to the plurality of distances and a plurality of sight line deflection angles, which is not limited to the method described in the embodiment of the present disclosure.

It should be noted that, the flowchart of the geometric parameter measurement method provided by some embodiments of the present disclosure may comprise more or less operations, and the operations may be performed sequentially or in parallel. Although the flowchart of the geometric parameter measurement method described above comprises a plurality of operations occurring in a specific order, it should be clearly understood that, the order of the plurality of operations is not limited. The geometric parameter measurement method described above may be performed once or may be performed a plurality of times according to predetermined conditions.

The geometric parameter measurement method provided by at least one embodiment of the present disclosure can calculate the geometric parameters of the target object according to the left eye image and the right eye image, thereby expanding the function of the AR device and improving the user experience of the AR device.

Figure 5A:
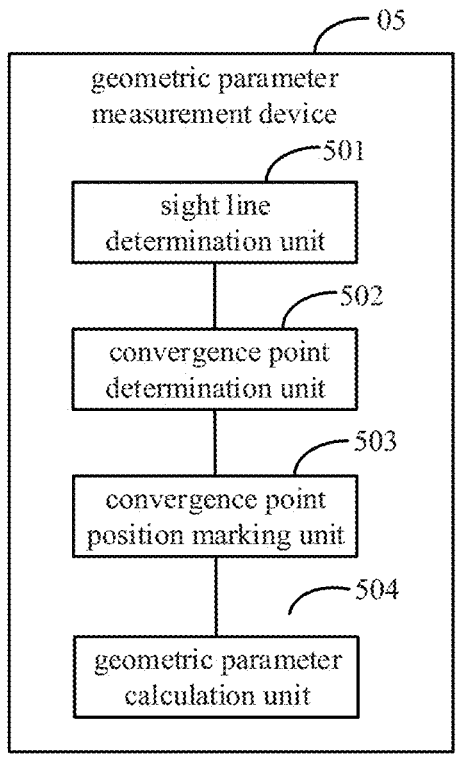
FIG. 5A is a schematic block diagram of a geometric parameter measurement device according to at least one embodiment of the present disclosure.

At least one embodiment of the present disclosure also provides a geometric parameter measurement device based on an augmented reality device. FIG. 5A is a schematic block diagram of a geometric parameter measurement device according to at least one embodiment of the present disclosure. As shown in FIG. 5A, in some examples, the geometric parameter measurement device 05 comprises a sight line determination unit 501, a convergence point determination unit 502, and a geometric parameter calculation unit 504.

The sight line determination unit 501 is configured to acquire a left eye image and a right eye image upon a user gazing at a target object and determine a left eye sight line and a right eye sight line based on the left eye image and the right eye image, which images are acquired upon the user gazing at the target object. For example, the sight line determination unit 501 can implement the step S10, a specific implementation method of the sight line determination unit 501 can refer to the related description of the step S10, and details are not described herein again.

The convergence point determination unit 502 is configured to determine, according to the left eye sight line and the right eye sight line, a convergence point of the left eye sight line and the right eye sight line. For example, the convergence point determination unit 502 can implement the step S20, a specific implementation method of the convergence point determination unit 502 can refer to the related description of the step S20, and details are not described herein again.

The geometric parameter calculation unit 504 is configured to calculate a distance between a position of the convergence point and the user in a case of receiving an instruction which is used to indicate that the position of the marked convergence point coincides with a desired position on the target object. For example, the geometric parameter calculation unit 504 can implement the step S40, a specific implementation method of the geometric parameter calculation unit 504 can refer to the related description of the step S40, and details are not described herein again.

For example, in some other examples, the geometric parameter measurement device 05 also comprises a convergence point position marking unit 503. For example, the convergence point position marking unit 503 is configured to mark a position of the convergence point in a case where the retention time period of the convergence point is greater than a preset threshold. In this example, the geometric parameter calculation unit 504 is configured to calculate the geometric parameters of the target object in a case where the position of the convergence point, which is marked, coincides with the desired position on the target object. For example, the convergence point position marking unit 503 can implement the step S30, a specific implementation method of the convergence point position marking unit 503 can refer to the related description of the step S30, and details are not described herein again.

Figure 5B:
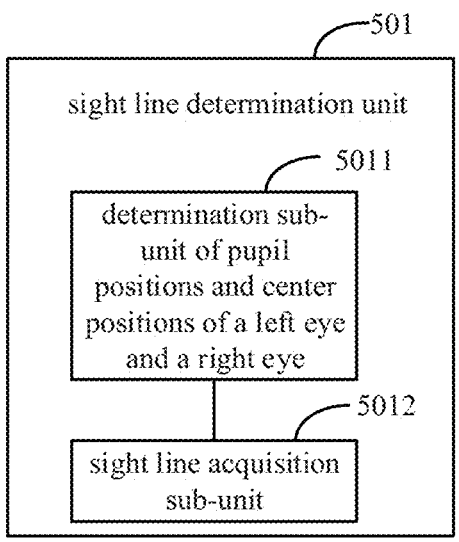
FIG. 5B is a schematic block diagram of a sight line determination unit as shown in FIG. 5A.

For example, in some implementations, as shown in FIG. 5B, the sight line determination unit 501 comprises a determination sub-unit 5011 of pupil positions and center positions of a left eye and a right eye and a sight line acquisition sub-unit 5012.

The determination sub-unit 5011 of pupil positions and center positions of a left eye and a right eye is configured to, based on the left eye image and the right eye image, which images are acquired upon the user gazing at the target object, determine a left eye pupil position, a right eye pupil position, a left eye center position, and a right eye center position.

The sight line acquisition sub-unit 5012 is configured to determine the left eye sight line and the right eye sight line according to the left eye pupil position, the right eye pupil position, the left eye center position, and the right eye center position.

Figure 5C:
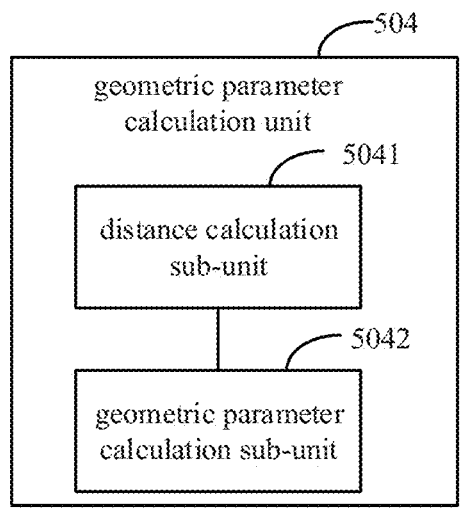
FIG. 5C is a schematic block diagram of a geometric parameter calculation unit as shown in FIG. 5B.

For example, in some examples, as shown in FIG. 5C, the geometric parameter calculation unit 504 comprises a distance calculation sub-unit 5041 and a geometric parameter calculation sub-unit 5042.

For example, the distance calculation sub-unit 5041 is configured to calculate a distance between a position of the convergence point and the user in a case where the position of the convergence point which is marked coincides with the desired position on the target object.

For example, specifically, the distance calculation sub-unit 5041 is configured to calculate the distance between the position of the convergence point and the user according to a complementary angle of an included angle between the left eye sight line and a straight line passing through the left eye center position and the right eye center position, a complementary angle of an included angle between the right eye sight line and the straight line passing through the left eye center position and the right eye center position, and a linear distance between the left eye center position and the right eye center position.

The geometric parameter calculation sub-unit 5042 is configured to determine the geometric parameters of the target object according to a plurality of distances between positions of a plurality of convergence points and the user, and a sight line deflection angle upon the user gazing at different desired positions on the target object.

Corresponding to the embodiment of the aforementioned geometric parameter measurement method, the geometric parameter measurement device provided by the present disclosure can expand the function of the AR device and improve the user experience of the AR device.

The embodiments of the device described above are merely illustrative, the units described as separate components may or may not be physically separate, that is, may be located in one place, or may be distributed to a plurality of network units; the above units may be combined into one unit, or each unit may be further split into a plurality of sub-units.

Through the descriptions of the above implementations, the device of the embodiment may be implemented by means of software, or by means of software with necessary general hardware, certainly, the device of the embodiment may also be implemented by means of hardware. Based on such understanding, the technical solution of the present disclosure or the part contributing to the prior art can be embodied in the form of a software product in essence, taking the software implementation as an example, a device, which is a device in logical sense, is formed by reading, by a processor in which an augmented reality AR device, to which the device is applied, is located, a corresponding computer program instruction in a non-volatile memory into an internal memory to be executed It should be noted that, the geometric parameter measurement device provided by the embodiments of the present disclosure may comprise more or fewer circuits, and the connection relationship among the respective circuits is not limited and may be determined according to actual needs. The specific configuration of each circuit is not limited, and may be composed of an analog device according to the circuit principle, may also be composed of digital chips, or other suitable manners.

Figure 5D:
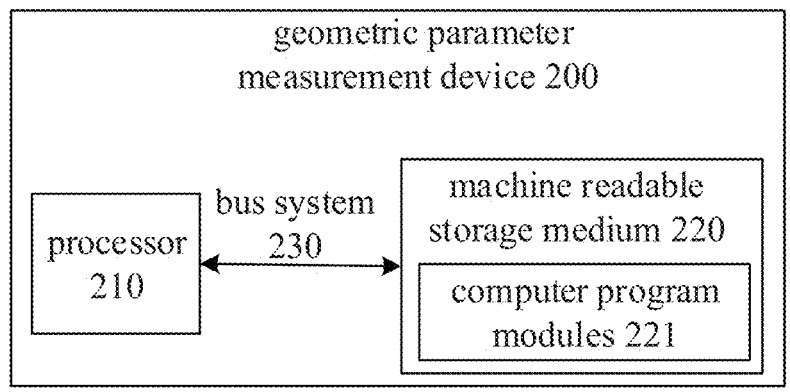
FIG. 5D is a schematic block diagram of another geometric parameter measurement device according to at least one embodiment of the present disclosure.

FIG. 5D is a schematic block diagram of another geometric parameter measurement device according to at least one embodiment of the present disclosure. As shown in FIG. 5D, the geometric parameter measurement device 200 comprises a processor 210, a machine readable storage medium 220, and one or more computer program modules 221.

For example, the processor 210 is connected to the machine readable storage medium 220 via a bus system 230. For example, the one or more computer program modules 221 are stored in the machine readable storage medium 220. For example, the one or more computer program modules 221 comprise instructions which are used to be executed to achieve the geometric parameter measurement method according to any one embodiment of the present disclosure. For example, the instructions in the one or more computer program modules 221 may be executed by the processor 210. For example, the bus system 230 may be a serial communication bus, a parallel communication bus, or the like, the embodiments of the present disclosure are not limited thereto.

For example, the processor 210 may be a central processing unit (CPU), a graphics processing unit (GPU), or other forms of processing unit having data processing capabilities and/or program execution capabilities, may be a general purpose processor or a dedicated processor, and may control other components in the geometric parameter measurement device 200 to perform desired functions.

The machine readable storage medium 220 may comprise one or more computer program products. The computer program products may comprise various forms of computer-readable storage media, such as volatile memory and/or non-volatile memory. The volatile memory may comprise, for example, a random access memory (RAM) and/or a cache or the like. The non-volatile memory may comprise, for example, a read only memory (ROM), a hard disk, a flash memory, and the like. One or more computer program instructions may be stored on the computer-readable storage medium, the processor 210 may execute the program instructions to implement the functions (which are to be achieved by the processor 210) and/or other desired functions such as the geometric parameter measurement method or the like in the embodiments of the present disclosure. Various applications and data, such as a convergence point and various data used and/or generated by application programs, etc., can also be stored in the computer-readable storage medium.

It should be noted that in order to be clear and concise, the embodiment of the present disclosure does not illustrate all components of the geometric parameter measurement device 200. Those skilled in the art can provide and set other components, which are not illustrated in the figures, of the geometric parameter measurement device 200 according to actual requirements to achieve necessary functions of the geometric parameter measurement device 200, and the embodiment of the present disclosure is not limited thereto.

Technical effects of the geometric parameter measurement device 100 and the geometric parameter measurement device 200 in different embodiments can refer to the technical effects of the geometric parameter measurement method provided by the embodiment of the present disclosure, and details are not described here again.

Figure 5E:
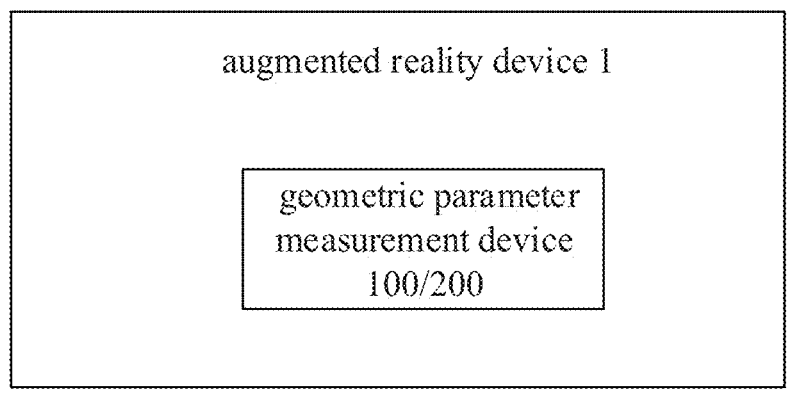
FIG. 5E is a schematic block diagram of an augmented reality device according to at least one embodiment of the present disclosure.

At least one embodiment of the present disclosure also provides an augmented reality device. FIGS. 5E-6 are schematic diagrams of an augmented reality device according to at least one embodiment of the present disclosure.

As shown in FIG. 5E, in an example, the augmented reality device 1 comprises the geometric parameter measurement device 100/200 provided by any one embodiment of the present disclosure. The specific description of the geometric parameter measurement device 100/200 may refer to the related descriptions of FIG. 5A to FIG. 5D, and details are not described herein again.

Figure 5F:
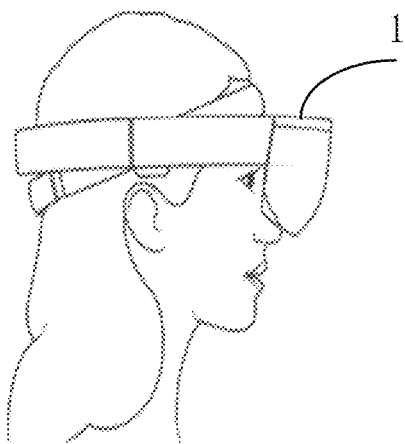
FIG. 5F is a schematic diagram of an augmented reality device according to at least one embodiment of the present disclosure.
Figure 6:
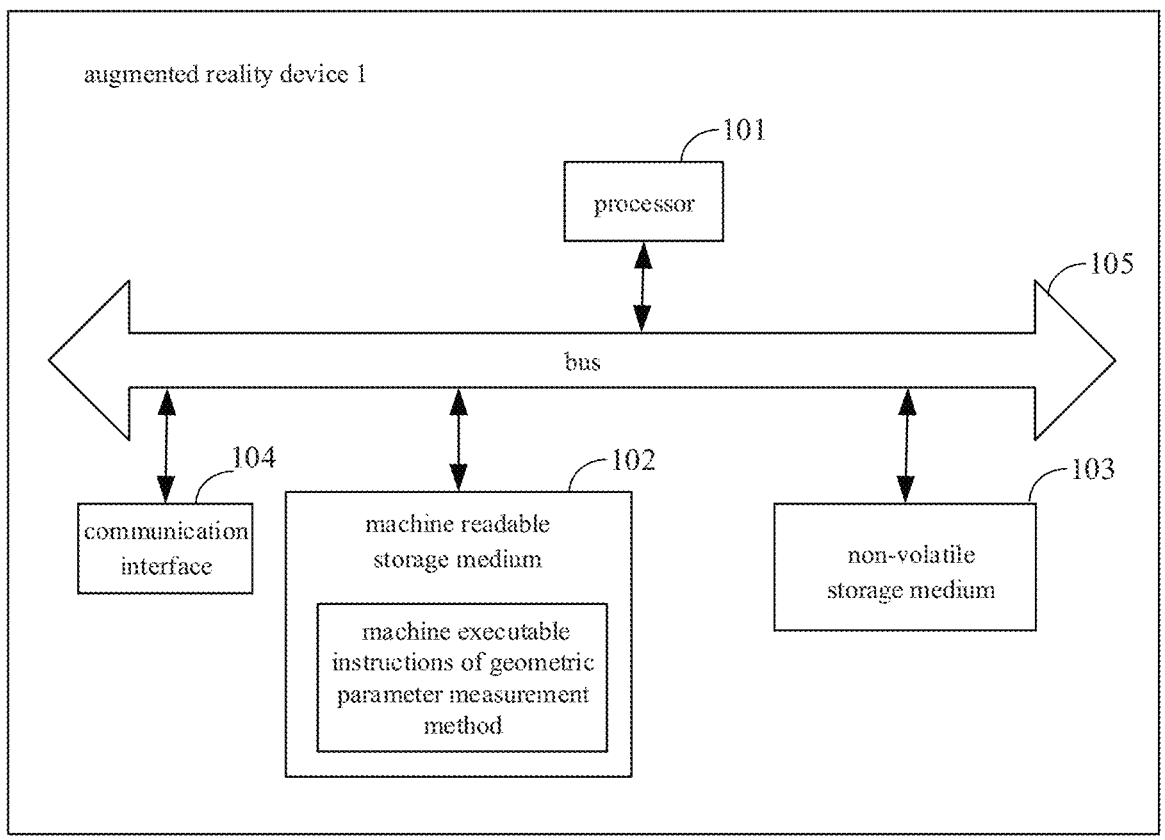
FIG. 6 is a hardware structural diagram of an augmented reality device according to at least one embodiment of the present disclosure.

As shown in FIG. 5F, the augmented reality device 1 can be worn in eyes of a user, a target object (not shown) can be located in front of the user, so that the geometric parameter measurement function can be achieved as needed.

For example, in another example, as shown in FIG. 6, the AR device 1 comprises a processor 101 and a machine readable storage medium 102, may also comprise a non-volatile medium 103, a communication interface 104, and a bus 105. For example, the machine readable storage medium 102, the processor 101, the non-volatile medium 103, and the communication interface 104 achieve communication with each other via the bus 105. The processor 101 reads and executes machine executable instructions, corresponding to the control logic of the geometric parameter measurement method, in the machine readable storage medium 102.

For example, the communication interface 104 is connected to a communication device (not shown). The communication device can communicate with the network and other devices through wireless communication, the network, for example, may be the Internet, an intranet and/or a wireless network such as a cellular telephone network, a wireless local area network (LAN) and/or a metropolitan area network (MAN). The wireless communication can use any one of a variety of communication standards, protocols, and technologies, and can comprise, but not limited to, Global System for Mobile Communications (GSM), Enhanced Data GSM Environment (EDGE), Wideband Code Division Multiple Access (W-CDMA), Code Division Multiple Access (CDMA), Time Division Multiple Access (TDMA), Bluetooth, Wi-Fi (such as, based on IEEE 802.11a, IEEE 802.11b, IEEE 802.11g and/or IEEE 802.11n standards), Voice over Internet Protocol (VoIP), Wi-MAX, protocols for email, instant messaging, and/or short message service (SMS), or any other suitable communication protocol.

The machine readable storage medium mentioned in the embodiments of the present disclosure may be any electronic, magnetic, optical, or other physical storage device, and may contain or store information such as executable instructions, data, and the like. For example, the machine readable storage medium may be: RAM (Radom Access Memory), a volatile memory, a non-volatile memory, a flash memory, a storage driver (such as a disk driver), a storage disk of any type (such as a compact disc, a DVD, etc.), or a similar storage medium, or a combination of the above.

The non-volatile medium 103 can be a non-volatile memory, a flash memory, a storage driver (such as a disk driver), any type of storage disk (such as a compact disc, a DVD, etc.), or a similar non-volatile storage medium, or a combination of the above.

It should be noted that in order to be clear and concise, the embodiment of the present disclosure does not illustrate all components of the AR device 1. Those skilled in the art can provide and set other components, which are not illustrated in the figures, of the AR device 1 according to actual requirements to achieve necessary functions of the AR device 1, and the embodiment of the present disclosure is not limited thereto.

The augmented reality device provided by the embodiment of the present disclosure can determine the distance between the desired position on the target object and the user, the distance can allow the user to know the distance from a certain position on the target object to the user itself, and therefore, the function of the AR device is expanded and the user experience of the AR device is improved.

Figure 7:
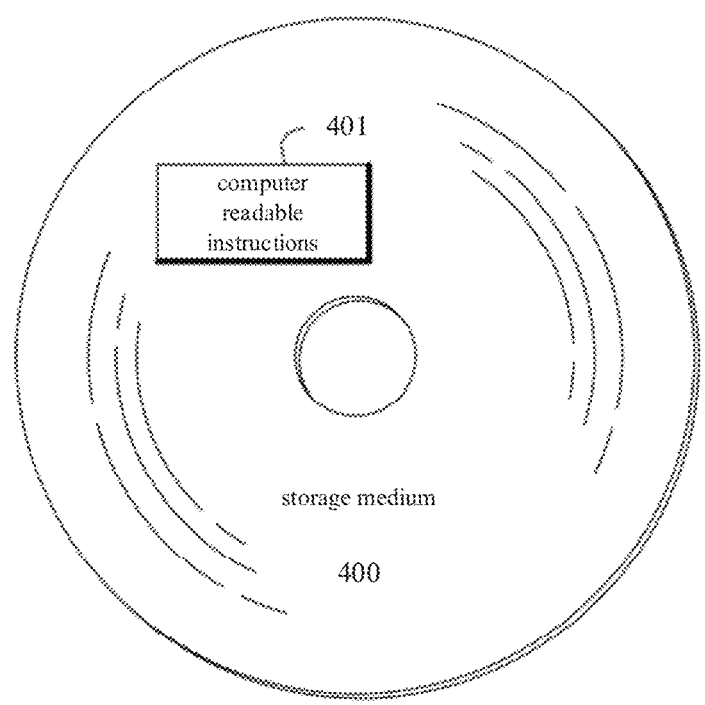
FIG. 7 is a schematic block diagram of a storage medium according to at least one embodiment of the present disclosure.

An embodiment of the present disclosure also provides a storage medium. For example, as shown in FIG. 7, the storage medium 400 non-transitorily stores computer readable instructions 401, in a case where the computer readable instructions 401, which are non-transitorily stored, are executed by a computer (including a processor), the geometric parameter measurement method provided by any one of the embodiments of the present disclosure may be executed.

For example, the storage medium may comprise an arbitrary combination of one or more computer readable storage media. For example, one computer readable storage medium comprises computer readable program codes for obtaining a left eye sight line and a right eye sight line, and another computer readable storage medium comprises computer readable program codes for determining a convergence point. For example, in a case where program codes are read by a computer, the computer can execute the program codes stored in the computer storage medium, such as the geometric parameter measurement method provided by any one of the embodiments of the present disclosure.

For example, the storage medium may comprise a memory card of a smart phone, a storage component of a tablet, a hard disk of a personal computer, a random access memory (RAM), a read only memory (ROM), an erasable programmable read only memory (EPROM), a portable compact disc-read only memory (CD-ROM), a flash memory, or an arbitrary combination of the above storage media, and may also be other suitable storage media.

The following should be noted:

(1) Only the structures involved in the embodiments of the present disclosure are illustrated in the drawings of the embodiments of the present disclosure, and other structures can refer to usual designs.

(2) The embodiments and features in the embodiments of the present disclosure may be combined in case of no conflict to obtain new embodiments.

What have been described above merely are exemplary embodiments of the disclosure and not intended to define the scope of the disclosure, and the scope of the disclosure is determined by the appended claims.

What is claimed is:

1. A geometric parameter measurement method, comprising:
    acquiring a left eye image and a right eye image upon a user gazing at a target object, and determining a left eye sight line and a right eye sight line based on the left eye image and the right eye image, which images are acquired upon the user gazing at the target object;
    determining, according to the left eye sight line and the right eye sight line, a convergence point of the left eye sight line and the right eye sight line; and
    calculating geometric parameters of the target object in a case where the convergence point coincides with a desired position on the target object,
    wherein determining the left eye sight line and the right eye sight line based on the left eye image and the right eye image, which images are acquired upon the user gazing at the target object, comprises:
    based on the left eye image and the right eye image, which images are acquired upon the user gazing at the target object, determining a left eye pupil position, a right eye pupil position, a left eye center position, and a right eye center position; and
    determining the left eye sight line and the right eye sight line according to the left eye pupil position, the right eye pupil position, the left eye center position, and the right eye center position, wherein calculating the geometric parameters of the target object comprises:
    respectively calculating a plurality of distances between positions of a plurality of convergence points and the user in a case where the positions of the plurality of convergence points coincide with a plurality of desired positions on the target object; and
    determining the geometric parameters of the target object according to the plurality of distances, which are calculated, between the positions of the plurality of convergence points and the user, and a sight line deflection angle upon the user gazing at different desired positions on the target object.

2. The method according to claim 1, wherein calculating the distance between the position of the convergence point and the user comprises:
    calculating the distance between the position of the convergence point and the user according to a complementary angle of an included angle between the left eye sight line and a straight line passing through the left eye center position and the right eye center position, a complementary angle of an included angle between the right eye sight line and the straight line passing through the left eye center position and the right eye center position, and a linear distance between the left eye center position and the right eye center position.

3. The method according to claim 1, wherein the plurality of distances between the positions of the plurality of convergence points and the user comprise: a first distance between a position of a convergence point, that coincides with a desired position on a first edge of the target object, and the user, and a second distance between a position of a convergence point, that coincides with a desired position on a second edge of the target object, and the user; and the first edge is an edge, which is opposite to the second edge, of the target object.

4. The method according to claim 3, wherein the sight line deflection angle, upon the user gazing at the different desired positions on the target object, is an angle between the first distance and the second distance.

5. The method according to claim 1, wherein the geometric parameters of the target object comprise: a height of the target object, a width of the target object, or a thickness of the target object.

6. The method according to claim 1, wherein the geometric parameters of the target object are calculated in a case of receiving an instruction which is used to indicate that the position of the convergence point, which is marked, coincides with the desired position on the target object.

7. The method according to claim 1, wherein the geometric parameter measurement method is applied to an augmented reality device.

8. A geometric parameter measurement device, comprising:
a processor;
a machine readable storage medium, storing one or more computer program modules, wherein the one or more computer program modules are stored in the machine readable storage medium and configured to be executed by the processor, and the one or more computer program modules comprise instructions which are used to be executed to achieve the geometric parameter measurement method according to claim 1.

9. A non-transitory storage medium, non-transitorily storing computer readable instructions, wherein in a case where the computer readable instructions, which are non-transitorily stored, are executed by a computer, the geometric parameter measurement method according to claim 1 is executed.

10. The method according to claim 1, wherein determining the left eye sight line and the right eye sight line based on the left eye image and the right eye image, which images are acquired upon the user gazing at the target object, comprises:
based on the left eye image and the right eye image, which images are acquired upon the user gazing at the target object, determining a left eye pupil position, a right eye pupil position, a left eye center position, and a right eye center position; and
determining the left eye sight line and the right eye sight line according to the left eye pupil position, the right eye pupil position, the left eye center position, and the right eye center position.

11. The method according to claim 1, further comprising:
marking a position of the convergence point in a case where a retention time period of the convergence point is greater than a preset threshold.

12. The method according to claim 11, wherein the geometric parameters of the target object are calculated in a case where the position of the convergence point, which is marked, coincides with the desired position on the target object.

13. A geometric parameter measurement device, comprising:
a sight line determination unit, configured to acquire a left eye image and a right eye image upon a user gazing at a target object and determine a left eye sight line and a right eye sight line based on the left eye image and the right eye image, which images are acquired upon the user gazing at the target object;
a convergence point determination unit, configured to determine, according to the left eye sight line and the right eye sight line, a convergence point of the left eye sight line and the right eye sight line; and
a geometric parameter calculation unit, configured to calculate geometric parameters of the target object in a case where the convergence point coincides with a desired position on the target object;
wherein the sight line determination unit comprises:
a determination sub-unit of pupil positions and center positions of a left eye and a right eye, configured to, based on the left eye image and the right eye image, which images are acquired upon the user gazing at the target object, determine a left eye pupil position, a right eye pupil position, a left eye center position, and a right eye center position; and
a sight line acquisition sub-unit, configured to determine the left eye sight line and the right eye sight line according to the left eye pupil position, the right eye pupil position, the left eye center position, and the right eye center position;
wherein the geometric parameter calculation unit comprises:
a distance calculation sub-unit, configured to respectively calculate a plurality of distances between positions of a plurality of convergence points and the user in a case where the positions of the plurality of convergence points coincide with a plurality of desired positions on the target object; and
a geometric parameter calculation sub-unit, configured to determine the geometric parameters of the target object according to the plurality of distances, which are calculated, between the positions of the plurality of convergence points and the user, and a sight line deflection angle upon the user gazing at different desired positions on the target object.

14. The device according to claim 13, further comprising:
a convergence point position marking unit, configured to mark a position of the convergence point in a case where a retention time period of the convergence point is greater than a preset threshold,
wherein the geometric parameter calculation unit is configured to calculate the geometric parameters of the target object in a case where the position of the convergence point, which is marked, coincides with the desired position on the target object.

15. The device according to claim 13, wherein the distance calculation sub-unit is configured to calculate the distance between the position of the convergence point and the user according to a complementary angle of an included angle between the left eye sight line and a straight line passing through the left eye center position and the right eye center position, a complementary angle of an included angle between the right eye sight line and the straight line passing through the left eye center position and the right eye center position, and a linear distance between the left eye center position and the right eye center position.

16. An augmented reality device, comprising the geometric parameter measurement device according to claim 13.

* * * * *